United States Patent [19]
Brugger et al.

[11] 4,031,362
[45] June 21, 1977

[54] ELECTRONIC REMOTE READING SYSTEM FOR A METER

[75] Inventors: Richard D. Brugger; Joseph A. Barna, both of Erie, Pa.

[73] Assignee: Zurn Industries, Inc., Erie, Pa.

[22] Filed: Sept. 17, 1975

[21] Appl. No.: 614,192

[52] U.S. Cl. .................... 235/92 FL; 235/92 MT; 235/92 R
[51] Int. Cl.² .......................................... G06M 3/12
[58] Field of Search ...... 235/92 DN, 92 EL, 92 FL, 235/92 GE, 92 DE, 92 PD, 92 MP, 92 NT, 92 FP, 92 MT; 340/248 R, 282

[56] References Cited
UNITED STATES PATENTS

| | | | |
|---|---|---|---|
| 3,092,991 | 6/1963 | Roe et al. | 235/92 FL |
| 3,127,594 | 3/1964 | Roe et al. | 235/92 EL |
| 3,154,672 | 10/1964 | Larkin | 235/92 FL |
| 3,169,185 | 2/1965 | Nines | 235/92 FL |
| 3,548,165 | 12/1970 | Linnenkamp | 235/92 R |
| 3,666,928 | 5/1972 | Burke et al. | 235/92 FL |
| 3,729,620 | 4/1973 | Jones | 235/92 FP |
| 3,873,814 | 3/1975 | Mirdadian | 235/92 FL |
| 3,946,208 | 3/1976 | Borgstrom | 235/92 MT |

*Primary Examiner*—Joseph M. Thesz

[57] ABSTRACT

An electronic remote reading system for a meter is disclosed, consisting of a permanent magnet on a shaft, rotating in proportion to volume passing through the meter. A switch, sensitive to a magnetic field, mounted on the outside of the meter in the influence of the magnetic field, a low current consumption circuit connecting the switch to a remotely located counter, powered by an energy source, such as alkaline batteries or a solar panel. The circuit is connected in such a manner that the power consumed is of such a small magnitude that the alkaline batteries have a life essentially equal to their shelf life. The solar panel is of a physical size to be mounted directly as part of the counter housing.

14 Claims, 10 Drawing Figures

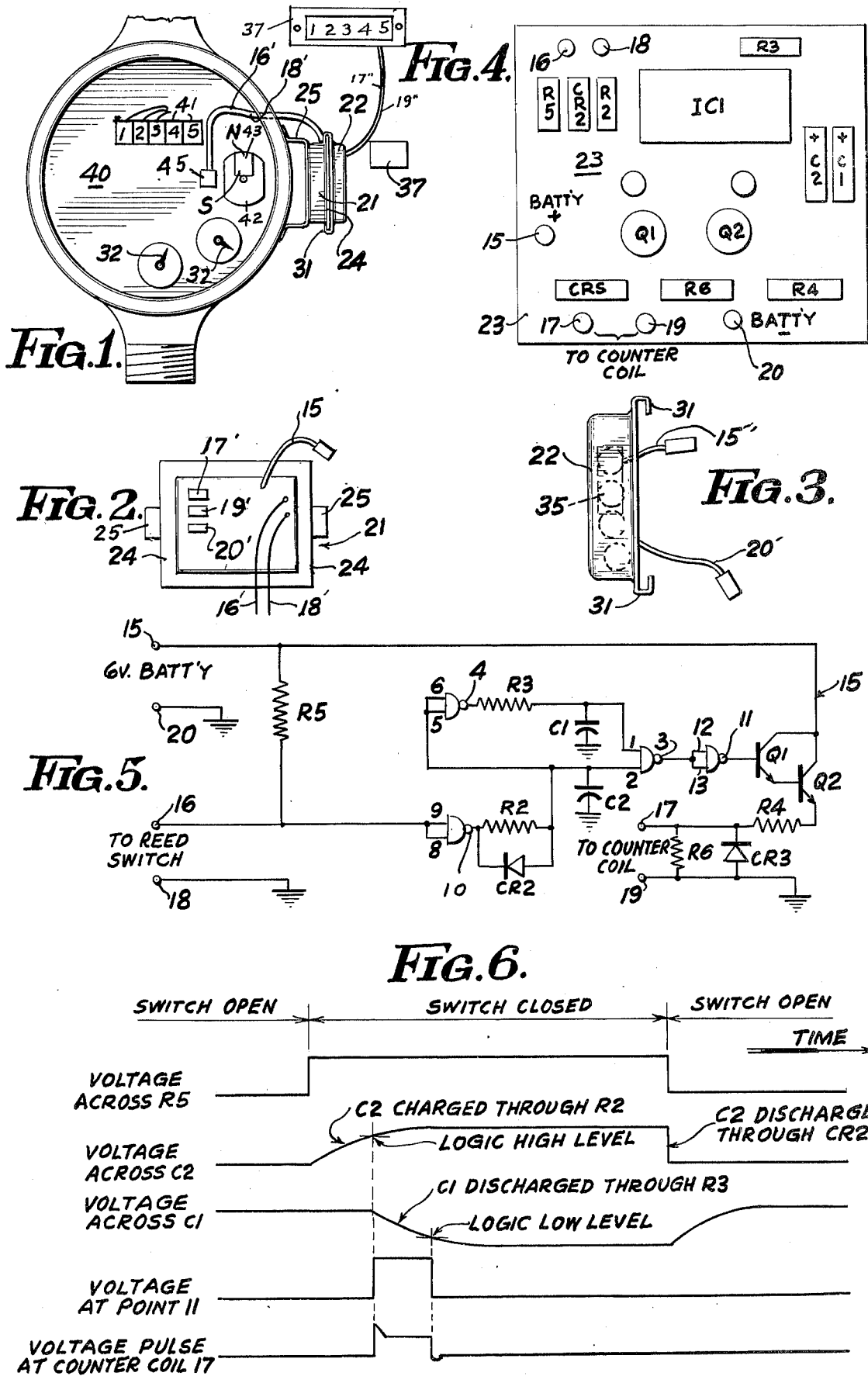

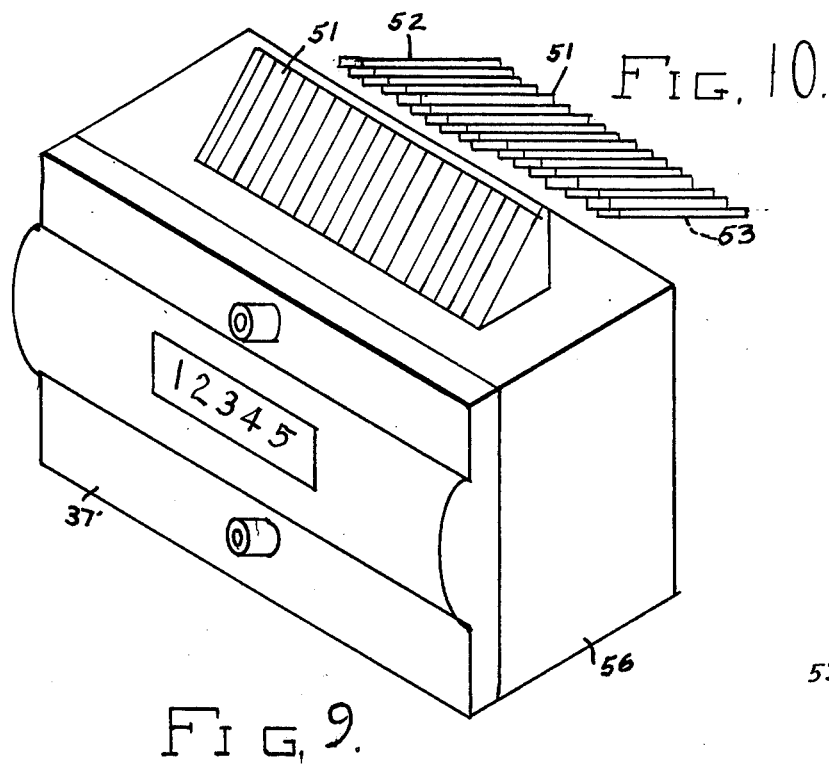
Fig. 10.
Fig. 9.
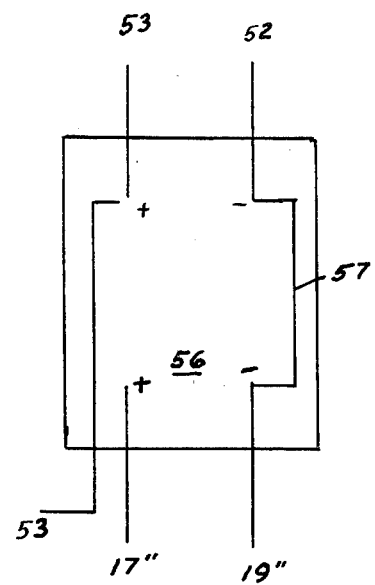
Fig. 7.
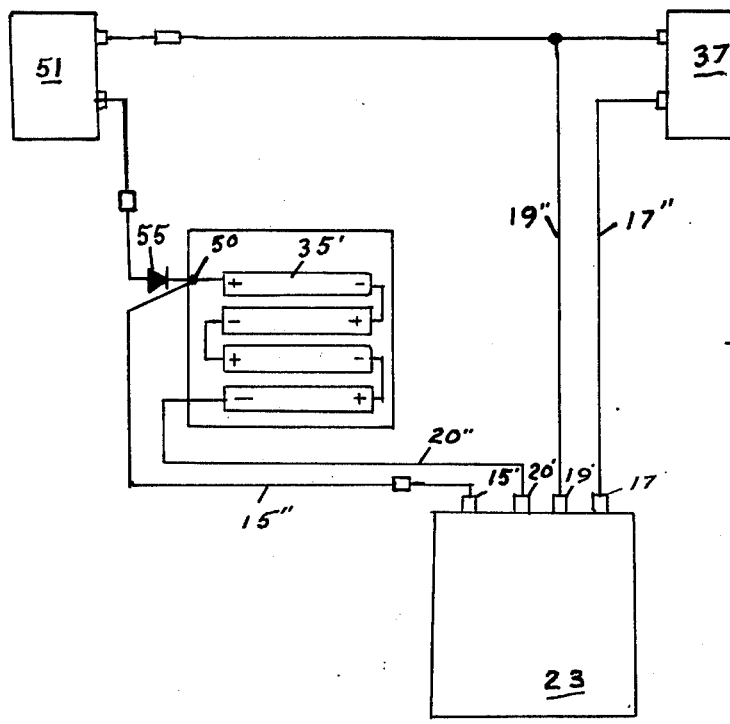
Fig. 8.

ELECTRONIC REMOTE READING SYSTEM FOR A METER

GENERAL STATEMENT OF INVENTION

Previously known methods of remote reading systems for meters consist of mechanical devices, referred to as self-generating systems, which store energy, during measurement by the meter, frequently by winding a spring. After a predetermined volume has been measured by the meter, the stored energy is released resulting in a shaft rapidly rotating inside a coil to generate an electrical impulse to a counter.

These systems depend on the proper initial and continuing fit between numerous mechanical parts such as gears, cams and springs for proper operation. These systems are often the victim of mechanical wear.

Previous attempts to simplify remote reading systems with the use of a separate power source were not successful because the power requirements were high, resulting in a need to replace the power source at short time intervals.

The system disclosed herein consists of the basic meter unit with flow measuring element, gear train and indicator wheels. The improvement, beyond the basic unit, consists of a holder for a permanent magnet mounted on a shaft which previously held a volume indicating pointer. In the case of a meter design where the entire gear train is immersed in the fluid being measured, commonly referred to as a wet-top design, the magnetic field from the magnet passes through the viewing window of the meter and acts upon a magnet actuated reed switch mounted on the outside of the viewing window. The reed switch has a normally open contact and is contained in a glass tube of conventional reed switch design. The contact is coined and rhodium plated to provide good electrical contact at low currents, in the microampere range.

Wire leads from the reed switch are connected to an electronic circuit which is mounted in its housing and which is secured to the meter. Additionally, wire leads from a remote counter unit of conventional general design and wire leads from a power source also connect to the electronic circuit. In one embodiment of the invention, the power source is a separate module that fastens to the housing of the electronic circuit. This module contains four AA size alkaline batteries inside a housing which easily mates with the housing of the electronic circuit. A wire seal is put through coincident holes of the assembly to discourage tampering and yet, to permit disassembly for replacement of the power source.

At fixed intervals, the registration at the meter is reconciled with the registration on the remote counter unit, and the power source is replaced.

In another embodiment of the invention, the power source is a solar panel, physically small enough to be mounted as part of the remote counter unit, with wire connections to a module consisting of AA size rechargeable sealed nickel-cadmium batteries. This module easily mates with the housing of the electronic circuit, and the assembly can be permanently fastened to prevent tampering, since this embodiment does not require replacement of the power source.

A power source lifetime essentially equivalent to the shelf life of the alkaline batteries, with a minimum of one year life, as described in the first embodiment, and the use of the small solar panel and rechargeable batteries to operate the system indefinitely under minimum light conditions as described in the second embodiment, are both made possible by the use of high impedances, extremely low power consumption, and C/MOS (Complimentary-Symmetry/Metal-Oxide-Semiconductor) monolithic integrated circuitry.

OBJECTS OF INVENTION

It is an object of the invention to provide an improved system for remote reading meters.

Another object of the invention is to provide a remote reading circuit that is simple in construction, economical to manufacture, and simple and efficient to use.

Another object of the invention is to provide a remote reading system that is capable of being simply modified to count volume in units other than those used for billing purposes in commercial water systems.

Another object of the invention is to provide a remote reading system wherein the circuit absorbs a minimal amount of electrical energy.

A further object of the invention is to provide a remote reading system wherein the circuit is so connected that it provides a signal to a remote counter unit only under one condition and prevents false signals under any other condition.

A further object of the invention is to provide a remote reading system that can be adapted easily to any meter that utilizes a shaft which rotates in proportion to the volume throughput of the meter.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 1 is a schematic view of the meter, electronic circuit housing, power source housing and remote counter unit according to the first described embodiment of the invention.

FIG. 2 is a front view of the electronic circuit housing, according to the invention.

FIG. 3 is a bottom view of the power source housing according to the first described embodiment of the invention.

FIG. 4 is a detailed view of the electronic circuit board with components, according to the invention.

FIG. 5 is a circuit diagram of the circuit used to actuate the reed switch.

FIG. 6 is a wave shape diagram showing the wave shapes of voltage passing through the different components of the circuit at different times.

FIG. 7 is a schematic view showing the back of the remote counter unit with the wire connections from the solar panel, electronic circuit and rechargeable batteries, according to the second described embodiment of the invention.

FIG. 8 is an electrical schematic of the solar panel, remote counter unit, rechargeable batteries and their connection to the electronic circuit, according to the second described embodiment of the invention.

FIG. 9 is an isometric view of the remote counter unit with solar panel according to the second embodiment of the invention.

FIG. 10 shows the solar panel and wire connections coming from it.

DETAILED DESCRIPTION OF THE DRAWINGS

Now with more particular reference to the drawings in FIG. 1, a remote reading system is shown for reading the meter 40. The meter 40 in the case of a water meter, may be of the type familiar to those skilled in the art, having a nonmagnetic case. As illustrated, the meter 40 may be of the type consisting of a measuring mechanism (not shown) and a registering mechanism which indicates units of volume flow, such as U.S. gallons or cubic feet.

The meter 40 is equipped with indicator shafts on which pointers 32 are normally positioned. The purpose of the pointers 32 is to indicate fractional units of the volume unit being indicated on the register wheels 41. It can be seen that the rotational speed of the pointers 32 is proportional to the flow passing through the meter.

In the meter 40 shown in FIG. 1, there are normally three pointers 32, one of which has been removed and replaced with a non-magnetic holder 42 which contains a ceramic magnet 43 having one north pole and one south pole, indicated respectively as N and S.

The ceramic magnet 43 is mounted eccentric from the axis of rotation of the non-magnetic holder 42. As fluid passes through the meter 40, the indicators 32 and magnet holder 42 rotate. As the magnet 43 approaches the magnetically actuated reed switch 45, the magnetic field from the magnet 43 passes through the viewing window 44 of the meter 40 and acts upon the reed switch 45, which is mounted on the outside of viewing window 44.

The reed switch 45 has a normally open contact and is in a glass tube of conventional reed switch design. Contacts are coined and rhodium plated to provide good electrical contact at low currents, in the microamp range.

When the magnetic field of the magnet 43 acts upon the reed switch 45, it causes closure of the normally open contact. This contact remains closed until the shaft on which the magnet holder 42 rotates further to remove the magnet 43 and its magnetic field from acting upon the reed switch 45. This results in a re-opening of the contact of the reed switch 45.

Two leads 16' and 18' from the reed switch 45 are connected to an electronic circuit 23 which is mounted in a housing 21, supported on the housing of the meter 40 by means of a bracket 25. The housing 21 has a bottom that is fixed to the bracket 25 with fasteners (not illustrated), and sides extending outwardly from the bottom to form the container and a peripheral flange 24 extending outwardly from the sides of the container.

The housing 21 has a circuit board 23 supported within it. The circuit board 23 contains the circuit shown in FIG. 5, with components arranged as shown in FIG. 4. The circuit board 23 and its components are totally encapsulated in the housing 21 for purposes of rigidity to provide mechanical stiffness and electronic protection and insulation for the components.

The printed circuit board in the housing 21 has terminals 15, 16, 17, 18, 19 and 20. Terminals 17, 19 and 20 are connected to terminal lugs 17', 19' and 20' which extend outwardly through the encapsulation as shown in FIG. 2. Terminals 15, 16 and 18 are connected to wires 15', 16' and 18' which also extend through the encapsulation as shown in FIG. 2.

In the first described embodiment of the invention, a disposable battery housing 22, shown in FIG. 3, is generally of the same size and configuration as the housing 21 for the electronic circuit. The flanges 31 of the battery housing 22 are turned back on each other so as to form a channel that can slide over the outwardly extending flange 24 of the electronic circuit housing 21. The batteries 35 used in this embodiment of the invention are four size AA alkaline cells connected in series with two leads. The batteries 35 are encapsulated within their housing 22 and have wire leads 15" and 20" extending through the encapsulation to be connected to the terminal lug 20 and the wire lead 15 extending through the encapsulation of the electronic circuit 23 shown in FIG. 5.

The counter unit 37 of conventional design with connections for two wires 17" and 19" which connect to terminal lugs 17' and 19' in the electronic circuit housing 21. The counter unit 37 can be located at any suitable remote location where it will be convenient to the meter reader.

The assembly of the remote reading system is as described. Leads 17" and 19" from the counter unit 37 shown in FIG. 1 are connected to the terminal lugs 17' and 19' in electronic circuit housing shown in FIG. 2. Leads 15" and 20" are connected to the lead 15' and terminal lug 20' in the electronic circuit housing of FIG. 2. Leads 16' and 18' from the reed switch 45 are already connected to the electronic unit 23. The battery housing is then slid over the outwardly extending flange 24 of the electronic circuit housing 21, and a seal wire is passed through coincident holes in the housings 22 and 21.

Disassembly to replace the power source is accomplished by removing the seal wire, removing the battery housing 22 and disengaging the leads 15" and 20" from the lead 15' and terminal lug 20'. Reassembly is accomplished by reversing the procedure.

In the second described embodiment of the invention, a battery housing 22 as shown in FIG. 3, with flanges 31 for assembly to the housing 21 of the electronic circuit 23, contains four size AA sealed nickel-cadmium rechargeable batteries 35' connected in series with two leads. An additional lead 50 is connected to the positive terminal of the first battery, as shown in FIG. 8 Lead 50 is connected to diode 55 as shown in FIG. 8.

Batteries 35' and diode 55 are encapsulated in the battery housing 22 with leads 15', 20' and 50 extending through the encapsulation to be connected to lead 15', terminal lug 20' and lead 52 respectively.

Referring to FIG. 9, the counter unit 37' consists of a conventional electro-mechanical counter such as described previously, a solar panel 51 and a housing 56 which protects the components from the environment and also provides means for mounting terminals to which electrical connections can be made.

The Solar panel 51 shown in FIG. 10, of conventional silicon cell design, consists of a multiple of individual cells joined in series to provide the desired output voltage and current with lead wires 53 at the positive end and 52 at the negative end. The Solar panel is mounted into the top of the counter housing 56 in a recessed area which permits covering with a transparent protective coating and leads 52 and 53 are fitted through openings in the internal walls of the counter housing 56, to be connected at terminals 52 and 53 on the back of the housing 56.

The electro-mechanical counter 37 is provided with wire leads as shown in FIG. 8, which connect to the terminals on the back of the counter unit housing 56. Lead wires from these terminal connections to the electronic circuit 23 are identified as 17' and 19'. As shown in FIG. 7, a jumper wire 57 connects the negative terminal from the Solar panel 51 to the negative terminal of the counter. The purpose of the jumper 57 is to permit three rather than four wires connecting the remote unit with the meter unit. The location of the jumper 57 is such that the counter may be disconnected and removed for repair or replacement without disturbing the Solar panel.

The assembly of the remote reading system is as described in the first embodiment of the invention, but with the additional connection of wire lead 53 from the positive terminal 52 of the Solar panel 51 to the positive terminal of the rechargeable batteries 35', through diode 55. Diode 55, employed as a blocking diode, serves to permit flow of energy from the Solar panel 51 to the batteries 35', and to prevent a flow of current from the batteries 35' back to the solar panel 51.

The electronic control circuit shown in FIG. 5 responds to the closure of reed switch 45 and puts out a pulse to the coil of remote counter unit 37 or 37'. The circuit will put out a pulse only when the reed switch 45 goes from the open to the closed condition. And, the duration of the pulse is a function of the values of the circuit components and not upon the time the switch is closed. No pulse is put out when (a) the reed switch 45 goes from closed to open, (b) the switch is in the closed state and DC power is removed and/or replaced, (c) the switch is in open state and DC power is removed and/or replaced.

FIG. 5 shows the electronic circuit. Circuit terminal 15 is connected to the positive battery terminal and circuit terminal 20 is connected to the negative battery terminal. Reed switch 45 is connected to terminals 16 and 18. The coil of the remote counter unit 37 or 37' is connected to terminals 17 and 19.

The logical element used in the control circuit is a NAND gate. When both inputs are at logical 1 (high) state, the output is at logical 0 (low) state. If either, or both inputs are low, then the output is high. One of these gates is shown with terminals 1 and 2 as inputs and 3 as output. The other three AND gates have input terminals connected together and they consequently act as inverters, that is, high inputs cause a low output. Conversely, low inputs cause a high output.

Operation of the circuit is most easily described with the reed switch 45 open and no voltage across R5. Terminals 8 and 9 are high, 10 is low. Diode CR2 conducts and keeps 5 and 6 low. Terminal 4 is high and charges C1 through R3. C1 charges to above logical high level. C2 is not charged (the action of CR2 holds it discharged) and it is below the logical low level. Consider the NAND gate 1, 2, 3, where 1 is high, 2 is low, and 3 will be high. With 3 high, 11 will be low. That causes the Darlington-connected transistors Q1 and Q2 to be off and no voltage is applied to the counter coil.

The reed switch 45 is supported in the housing of the meter 40 and when the reed switch 45 goes from open to closed, terminals 8 and 9 are pulled low and that results in 10 going high. Diode CR2 is back-biased and C2 is charged through R2, to above the logical high level. Thus, a logical high is on terminal 2. Recall that from the above paragraph, C1 was left with a logical high, so that at this time both 1 and 2 are high. A second effect of having C2 above logical high is that terminals 5 and 6 will be high, and 4 will be low, causing a discharge of C1 through R3. This is important because during the time interval from when C2 goes above logical high two when C1 goes down to logical low, both terminals 1 and 2 are high, causing 3 to go low. That time interval is the duration of the pulse to the counter coil, because during the time that 3 is low, 11 is high and the Darlington-connected transistor pair (Q1 and Q2) is turned on, which puts a voltage pulse to the counter coil. The pulse starts when voltage across C1 is high and voltage across C2 exceeds high level and the pulse ends when voltage across C1 drops below low logic level.

Wave shapes for pulse generation caused by reed switch closure as described above, are shown in FIG. 6. The non-generation of a pulse by other actions upon the circuit is important in this application, and can be shown by similar analysis of the circuit. Wave shapes for reed switch going from closed to open state are also shown in FIG. 6, and it can be seen that no pulse is generated in the transition.

What we can see from the circuit analysis and the wave shapes is that the circuit responds only to the proper sequence of events, i.e., that the reed switch must be going from the open to the closed state. That is the one and only condition that causes the circuit to put out a pulse, and it is an important criteria to prevent false pulses from triggering the counter coil.

There are three circuit states of interest for the circuit shown in FIG. 5, with waves shapes shown in FIG. 6 as follows: (a) Reed switch closed (16 and 18 connected), steady state (after the pulse has been delivered to the counter coil); (b) Reed switch open, steady state condition (see FIG. 6); (c) Pulse (Reed switch goes from open to closed state). (See voltage at point 11 in FIG. 6.

In state (a) the reed switch 45 is closed. R5 is 100 K ohms and it has 6 volts across it. That draws 0.06 ma. C/MOS circuit (the NAND gates) draws only 0.000001 ma. from the battery during steady state conditions. Including various leakage currents, this gives a total of about 0.065 ma.

For the state (b) the reed switch 45 is open and total current drain (C/MOS circuit and leakage currents) is about 0.005 ma.

During the state (c) a pulse is generated to operate the counter coil. That pulse is 150 ma for 150 ms or about 22.5 ma-sec per pulse.

Total current drain on an annual basis is calculated for a "typical use" and a "worst case" condition when this system is employed on a water meter in domestic service. Meter capacity in this example is 20 gallons per minute, with the remote counter unit registering one hundred gallon counts. An industry rule of thumb for domestic usage is 100,000 gallons per year, the "typical use" condition.

Assuming that state (a) would occur approximately 12 percent of the time (reed switch 45 held in closed position for approximately 45/360 of shaft rotation) and state (b) would occur approximately 88 percent of the time, and that approximately 20 pulses per week × 100 gal/pulse × 52 weeks/yr would be delivered to the coil of the remote counter unit (37 or 37') the total current drain on an annual basis is:

Average steady state current = 0.065 (0.12) + 0.005 (0.88) = 0.122 ma 8760 hours/yr × 0.0122 ma = 106.9 ma-hr/yr Pulse current for 20 pulses/week (−1040 pulses/yr) =

$$22.5 \frac{\text{ma-sec}}{\text{pulse}} \times \frac{\text{hour}}{3600 \text{ sec}} \times \frac{1040 \text{ pulses}}{\text{year}} = 6.5 \text{ ma-hr/yr}$$

Total current drain is 106.9 ma-hryr + 6.5 ma-hr/yr or 113.4 ma-hour per year.

A "worst case" condition exists if the meter is operated continuously at rated capacity. The current drain then is calculated as steady-state current:

[0.12 (0.065 ma) + 0.88 (0.005 ma)] × 24 hr/day × 365 day/yr = 106.87 ma-hr/yr Pulse current for 1 pulse/100 gal. and 20 gal/min: 22.5 ma-sec/pulse × hr/3600 sec × 1 pulse/100 gal × 20 gal/min × 1440 min day × 365 day/yr = 657 ma-hr/yr Total current drain is 106.87 ma-hr = 657 ma-hr = 763.87 ma-hr or approximately 764 ma-hr per year.

In the first described embodiment of the invention, the rating of the Alkaline AA batteries 35 is several times 113.4 ma-hour; the requirement for a "typical use" and the rating of the batteries is still several times the requirement of the "worst case" condition. The fact that the battery has a comparatively long time between pulses to recover from the 150 ma surge is a significant fact in the longevity of the battery. A second factor in the long battery life is the low steady-state current drawn by the circuit.

In the second described embodiment of the invention, a solar Panel 51, consisting of several individual cells, maintains a voltage level in the rechargeable batteries 35' to operate the counter coil.

The "typical use" condition described earlier indicated a power requirement of 113.5 ma-hr per year, which is 0.31 ma-hr/day and the "worst case" condition described earlier indicated a power requirement of 764 ma-hr per year, which is 2.09 ma-hr/day.

Commercially available solar cells of approximately 1 sq. in. area, operating with a 10 percent efficiency under minimum light conditions (such as open shade equivalent to 5 percent sunlight) for a fraction of a day, are capable of providing an output greater than the "worst case" requirement.

The fact that the 150 ma surge occurs at comparatively long time intervals and the fact that the steady-state current is of such a low value, make the application of a solar panel of the described physically small size practical.

The foregoing specifications set forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. A remote reading system for measuring the flow of a product comprising, an instrument having shaft means moveable in proportion to the flow of said product, contact means, actuating means on said shaft means adapted to close and open said contact means in response to movement of said shaft, an electrical circuit connected to said contact means and connected to a counter means for counting the number of times said contact is closed, said electrical circuit having a power source connected thereto, said circuit having means comprising an electronic valve connecting said power source to said counter means, a control element on said electronic valve, and electronic pulse forming means connected to said contact means and to said control element causing said electronic valve to respond to said closing of said contact and put out a pulse of relatively short duration to said counter when said contact goes from open to closed position and put out no pulse when said contact moves from closed to open position, whereby energy flows from said power source through said electronic valve into said counter during the time of said pulse only.

2. The circuit recited in claim 1 wherein said contact comprise a reed switch and said means on shaft comprises a magnet rotatable in relation to said reed whereby said reed is closed upon each revolution of said shaft.

3. The circuit recited in claim 2 wherein said circuit comprises logical elements including a NAND gate.

4. The circuit recited in claim 3 wherein said circuit has four gates, one of said gates being connected as a NAND gate, having its output terminal connected to both inputs of another said gate, so as to create an AND function, the other two said gates having input terminals connected together and acting as inverters having high inputs which cause a low output and conversely having low inputs causing high outputs.

5. The circuit recited in claim 2 wherein means is provided on said circuit to prevent an output pulse under either static switch condition, when said power source is either reconnected or disconnected from said circuit.

6. The circuit recited in claim 1 wherein said circuit puts out a pulse, the duration of said pulse being a function of the values of the circuit components, and not dependent upon the time duration of the switch closure.

7. The system recited in claim 1 wherein said circuit operates under at least 3 conditions, the condition when the said switch is closed and in steady state (after the pulse had been delivered to the counter coil), the condition when the switch is open and in steady state condition, and the condition when the said switch goes from open to closed position.

8. The system recited in claim 7 wherein said circuit utilizes energy at the rate of approximately 0.065 milliamperes during the condition when the switch is closed, steady state, approximately 0.005 milliamperes for the condition when the switch is open and approximately 22.5 milliampere-seconds during each pulse.

9. The system recited in claim 8 wherein said shaft rotates a relatively few times per year to measure the amount of product flow whereby a relatively few increments of energy are used during a normal year of operation of said system.

10. The system recited in claim 8 wherein said power source comprises alkaline batteries which have a life when connected in said circuit approximately equal to their shelf life, and wherein the batteries are provided in a container as an assembly which is easily removed and replaced.

11. The system recited in claim 8 wherein said power source comprises a solar panel which is integral with the counter unit and which provides an output to maintain a voltage level sufficient to provide a pulse to the counter unit.

12. The solar panel recited in claim 11 wherein stored energy means is provided and connected to said solar panel by means of a blocking diode and wherein the flow of current from the stored energy means to the solar panel is prevented by means of said blocking diode.

13. The system recited in claim 11 wherein said solar panel is of approximately one square inch area.

14. The system recited in claim 11 wherein said solar panel has a power capacity sufficient to power the circuit continuously under minimum light conditions of approximately 5 percent sun for four hours per day.

* * * * *